United States Patent
Bürk et al.

(10) Patent No.: US 7,092,807 B2
(45) Date of Patent: Aug. 15, 2006

(54) DEVICE FOR INCLINATION DETERMINATION AND ARRANGEMENT FOR THE SETTING OF A DRIVER COMMAND

(75) Inventors: Richard Bürk, Hochdorf (DE); Bernd Dietzel, Syrgenstein (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 10/344,600

(22) PCT Filed: Aug. 15, 2001

(86) PCT No.: PCT/EP01/09410

§ 371 (c)(1),
(2), (4) Date: Jun. 20, 2003

(87) PCT Pub. No.: WO02/14718

PCT Pub. Date: Feb. 21, 2002

(65) Prior Publication Data

US 2004/0030528 A1    Feb. 12, 2004

(30) Foreign Application Priority Data

Aug. 15, 2000   (DE) ............................... 100 40 558

(51) Int. Cl.
*G06F 19/00* (2006.01)
(52) U.S. Cl. .......................................... 701/65; 701/51
(58) Field of Classification Search .................... 701/1, 701/51, 65; 73/105, 146
See application file for complete search history.

(56) References Cited

U.S. PATENT DOCUMENTS

| 4,356,726 A | | 11/1982 | Yoshino ........................ 73/178 |
| 4,471,437 A | * | 9/1984 | Yoshino et al. ................ 701/65 |
| 4,884,057 A | * | 11/1989 | Leorat .......................... 340/456 |
| 4,980,668 A | * | 12/1990 | Leigh-Monstevens ....... 340/456 |
| 5,303,153 A | * | 4/1994 | Sakai et al. ................... 701/57 |
| 5,389,050 A | * | 2/1995 | Sakai et al. ................... 701/57 |
| 5,703,776 A | * | 12/1997 | Soung .......................... 701/65 |
| 6,106,434 A | | 8/2000 | Ibamoto et al. ............. 477/120 |
| 6,494,088 B1 | | 12/2002 | Albert et al. ............... 73/118.1 |
| 6,738,704 B1 | * | 5/2004 | Kawasaki ..................... 701/80 |

FOREIGN PATENT DOCUMENTS

| DE | 30 45 980 | 9/1981 |
| DE | 39 37 160 | 5/1991 |
| DE | 196 21 404 | 11/1996 |
| DE | 198 21 725 | 11/1998 |
| DE | 198 38 393 | 3/1999 |
| DE | 198 34 212 | 2/2000 |
| GB | 2 319 312 | 5/1998 |

* cited by examiner

*Primary Examiner*—Gary Chin
(74) *Attorney, Agent, or Firm*—Ostrolenk, Faber, Gerb & Soffen, LLP

(57) ABSTRACT

The invention relates to a device for the determination of the inclination of the roadway in a vehicle, with an arrangement (4), for at least the indirect determination of parameters, which at least indirectly characterize the inclination of the roadway. Said arrangement (4), for the at least indirect determination of parameters which at least indirectly characterize the inclination of the roadway, forms a construction unit (5) with a device (1) which may be operated by the driver for setting a driver command which alters or sets the driving state of a gearbox unit.

13 Claims, 4 Drawing Sheets

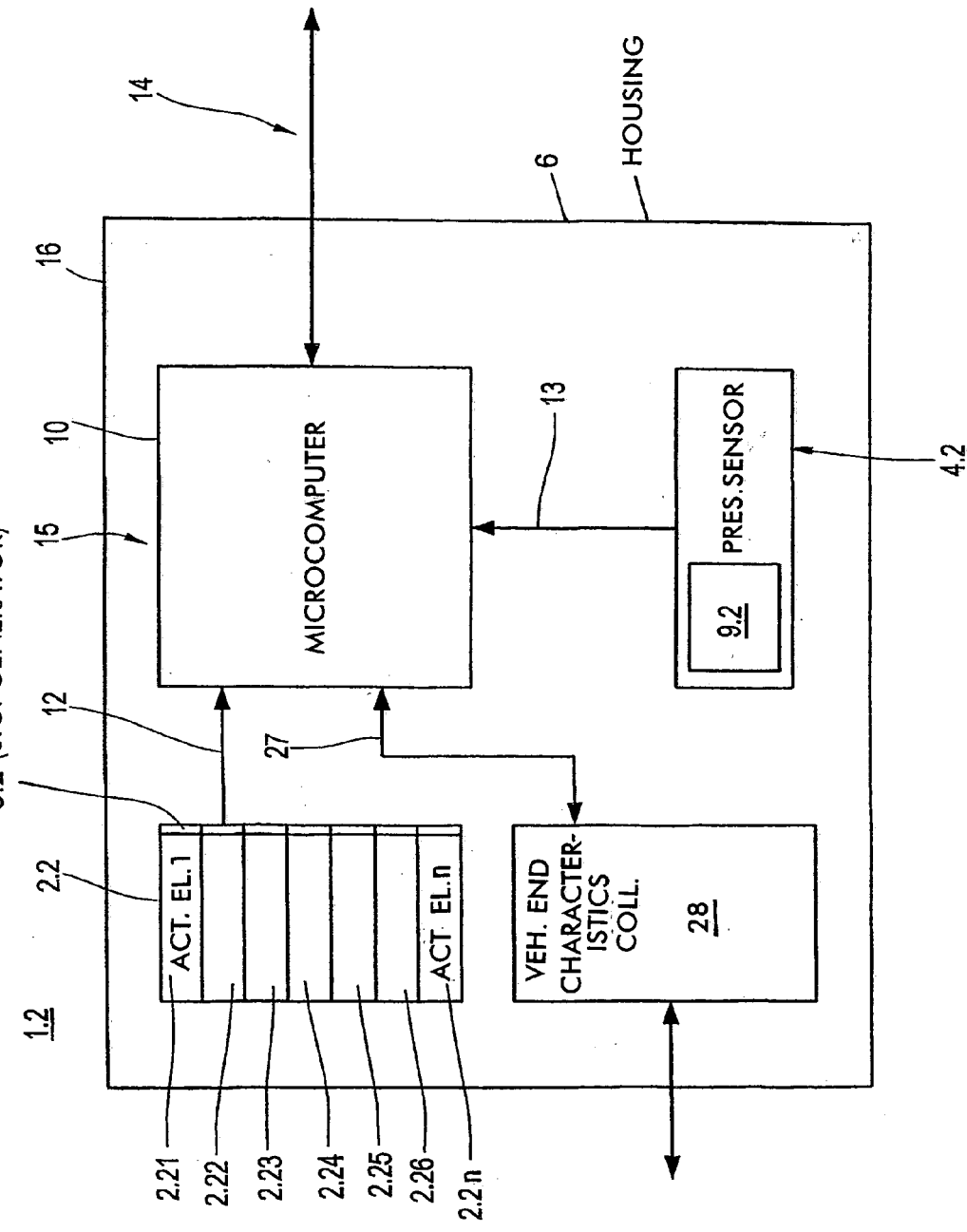

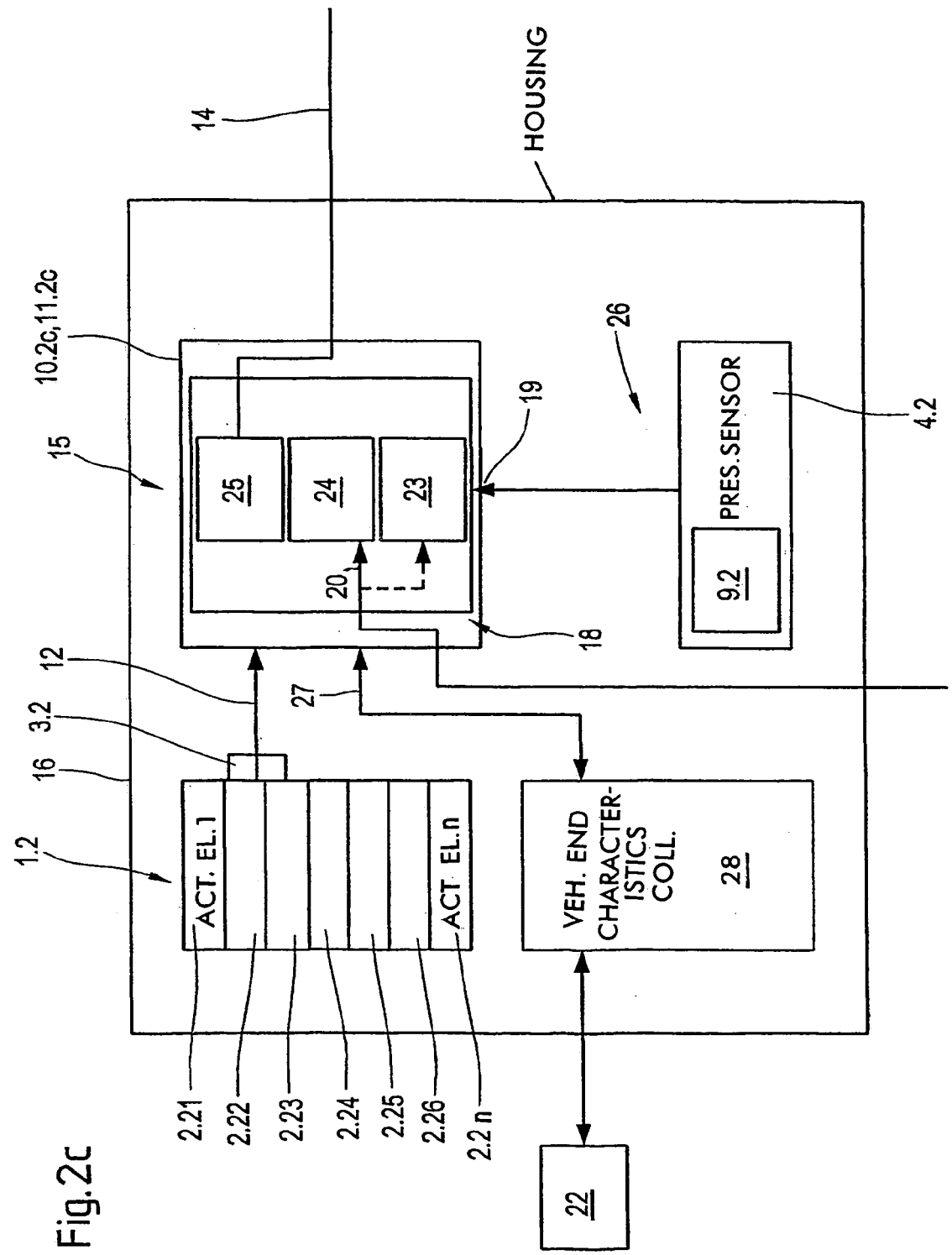

DEVICE FOR INCLINATION DETERMINATION AND ARRANGEMENT FOR THE SETTING OF A DRIVER COMMAND

FIELD OF THE INVENTION

The invention relates to an arrangement for sensing the inclination and a device for predefining a driver's request for setting or changing a driving state.

BACKGROUND INFORMATION

Increasing emphasis is being placed on optimized engine transmission management for the actuation of automatic transmissions or automated transmissions in vehicles. In order to ensure that the driving machine operates in accordance with a characteristic curve of optimum efficiency in the characteristic diagram of the driving machine, a characteristic curve of optimized consumption or some other desired criterion, it is necessary also to take into account a series of peripheral conditions which at least indirectly exert an influence on the mode of operation of the driving machine. In addition to the peripheral conditions which occur at the vehicle and are to be taken into account, for example, the connection and disconnection of secondary assemblies, the peripheral conditions which are not specific to vehicles also play a significant role. These include, inter alia, the condition of the route, in particular information on the inclination of the roadway, which result either in an increased or decreased power demand and thus an increased or decreased power requirement on the driving machine. A device which reliably senses the inclination of the vehicle with respect to the horizontal even under the influence of the velocity and acceleration of the vehicle has not been known hitherto. Sensing by means of specific resources, for example a pendulum, is possible, without additional plausibility checks, only in the stationary state, and when the vehicle is being driven is not possible however without taking into account the driving velocity and acceleration, which are expressed in complicated computational models. In a parallel unpublished application, it is proposed in this respect that the inclination be determined from the difference in altitude between two reference events, the difference in altitude being determined for at least two different reference events, characterizing the locomotion state of the vehicle in the driving direction, from the overall air pressure which respectively prevails at the vehicle. In each case the altitude of the vehicle above zero is determined for the first reference event, and the second altitude $h_2$ is determined for the second reference event, from the respective pressure values—first pressure value $p_1$ for a first reference event and second pressure value $p_2$ for a second reference event, from the barometric altitude formula for the gravitational pressure in air. The two reference events also characterize, either directly or indirectly, a reference distance $\Delta s$ which is characterized by the local distance between the position of the vehicle with respect to both reference events. The tangent of the angle, characterizing the inclination N, between the horizontal and the roadway, and thus the angle $\alpha$ for the inclination of the roadway with respect to the horizontal, are determined from the quotient formed from the difference between the altitudes—second altitude and first altitude—and the reference distance $\Delta s$. The sensing of the inclination of the roadway in a vehicle always takes place here between at least two reference events, but a multiplicity of individual sensing operations, and thus a multiplicity of assessments of successive reference events which are performed one after the other may also be carried out for precise sensing. However, the possibility of ensuring a precise determination of the altitude is dependent to a considerable degree on the positioning of the inclination or pressure sensor.

SUMMARY OF THE INVENTION

The invention is therefore based on the object of integrating an arrangement for determining inclination, in particular an inclination sensor, in the vehicle in such a way so that, on the one hand, a reliable and informative determination of pressure can be carried out, and in addition the arrangement is characterized by easy exchangeability as well as short lengths of the line connections to other devices which process the pressure values.

An arrangement for determining the inclination of the roadway in a vehicle comprises a device for at least indirectly sensing a variable which at least indirectly characterizes the inclination of the roadway. At least indirectly means indirectly or directly, i.e. the variables which are specifically necessary for sensing the inclination are either determined by means of other variables or else sensed directly. However, for simplicity of expression, the words "at least indirectly" will often be omitted, but it is to be understood that indirectly and directly is intended to be encompassed in the various measurements, derivations, computations, characterizations etc. described herein. The device for at least indirectly sensing a variable which at least indirectly characterizes the inclination of the roadway forms, according to the invention, one structural unit with a device for predefining and/or sensing a driver's request for setting or changing a driving state, in particular for predefining a setpoint value for a driver's request for actuating the individual switching elements and/or other power-transmitting elements of a transmission unit via a control device in order to actuate a transmission unit. The term "device for predefining a driver's request" is to be understood here as the preselection possibility of a driving state by an arrangement.

The solution according to the invention for forming a structural unit from device predefining a driver's request for setting or changing a driving state of a transmission unit, and device for sensing a variable which at least indirectly characterizes the inclination of the roadway makes it possible to provide a structural unit which is particularly compact and can be handled independently. Said structural unit simultaneously constitutes an optimal arrangement possibility for the pressure sensor for the purpose of determining the ambient pressure for sensing inclination. The sensing of the pressure is carried out here at a location which is virtually free of factors which considerably influence the determination of pressure. The device for predefining a driver's request for changing or setting the driving state is, in particular, when embodied as a pushbutton key switch, a system which is largely open to air and which is integrated in the driver's workstation. The latter is therefore suitable to an optimum degree for the arrangement of a sensor, in particular air pressure sensor for sensing a variable which at least indirectly describes the inclination of the roadway. In particular the air pressure sensor provides the great advantage of being independent from the installation position.

The combination process in order to form the structural unit is carried out either by:

a) integrating the device for sensing a variable which at least indirectly characterizes the inclination of the roadway, or b) connecting the device for predefining a driver's request for setting or changing a driving state and the device for sensing at least a variable which at least indirectly describes the inclination of the roadway to one another by flanges in the region of their housings.

The device for at least indirectly sensing a variable which at least indirectly describes the inclination of the roadway comprises at least one sensor which is preferably embodied as a pressure sensor.

The entire device for determining the inclination of the roadway in a vehicle also comprises at least one calculation device which is arranged either in the region of the device for preselecting the driver's request or integrated in a control device which is assigned to a component of the drive train, preferably the transmission unit, or is formed by the latter and which has an input in the case of serial data transmission or at least two inputs in the case of parallel data transmission, as well as, depending on the type of data transmission, at least one output for outputting the magnitude of the inclination of the roadway in the form of an angle $\alpha_N$ or when indicated in % N. The individual inputs are coupled here either directly or indirectly, i.e. without or with intermediate connection of further devices with different functions to devices for sensing the variables which are necessary to determine the angle $\alpha_N$ of the inclination N. The first input is coupled here to a device for sensing a variable which at least indirectly describes the pressure p, while the second input is connected to a device for sensing at least one variable which at least indirectly describes the route traveled between two reference events. The pressure is preferably sensed directly. The device for sensing a variable which at least indirectly describes the pressure comprises at least one pressure sensor for this purpose. The device for sensing the route or the variables, at least indirectly characterizing the route, between the two reference events may be embodied in a variety of ways, for example in the form of a displacement pickup. Another possibility is to sense the route indirectly from the velocity, the acceleration and the period of time between both reference events. These are processed in the calculation device in accordance with the variables present at the inputs. Here, the pressure values which are sensed with respect to two reference events, which can be described, for example, by means of two different times for characterizing the position of the vehicle, are converted into the corresponding altitudes from the barometric altitude formula taking into account a correction algorithm. The route between the reference events can be determined here either directly when a displacement pickup is used, from the variable present at the second input, or it must be determined, in particular calculated, from the variables describing the coordinates of the position of the vehicle with respect to the individual reference events. There are also a multiplicity of possibilities for this, said possibilities amounting to a simple geometric distance calculation, for which reason more details are not given in particular here. The inclination N of the roadway is obtained from the tangent of an angle which is determined from the difference between the altitude values which are obtained for the individual reference events, and the route.

The individual calculation steps are carried out here either a) in individual calculation units which are isolated from one another and spatially separated from one another, i.e. arranged in a decentralized fashion, or take place b) in calculation units which are integrated into one structural unit.

The respectively last calculation unit has, in both cases, the output which is designed to output a value for the inclination of the roadway. This output preferably forms the output of the calculation device at the same time.

In case b) the arrangement is embodied as an independent structural unit which is present as an arrangement and thus forms in itself the overall functional unit of an inclination sensor. In case a) there is a structural unit composed of subunits which are arranged in a decentralized fashion and which are preferably coupled to one another using means for serial data transmission, for example, a CAN bus. In both cases, mechanical or physical signals are sensed and a corresponding signal, preferably an electrical signal for the inclination value of the roadway is formed from them.

The calculation device is preferably arranged in the direct spatial vicinity of the device for sensing a variable which at least indirectly characterizes the inclination of the roadway. Spatial distances are also conceivable, but preferably only for the part of the calculation device which the mathematical operations to be performed from the determined altitudes use to determine the inclination of the roadway.

According to a further solution, the device for predefining a driver's request for setting or changing a driving state of a transmission unit comprises at least one actuation element and means for generating at least one signal from a physical variable which at least indirectly describes the actuation of the actuation element. According to the invention, this also comprises a device for sensing a variable which at least indirectly characterizes the inclination of the roadway. The device for at least indirectly sensing a variable which at least indirectly describes the inclination of the roadway comprises at least one sensor which is preferably embodied as a pressure sensor.

A further possibility is to use, as the device for at least indirectly sensing a variable which at least indirectly describes the inclination of the roadway, an inclination sensor which determines the inclination on the basis of thermal convection. Said sensor is embodied as a sensor structural unit, comprising at least two temperature sensors which are connected to one another by means of a bridge. In between the sensors there is a heating element. These elements are encapsulated here in a hermetically sealed housing and form a sensor structural unit. Here, the enclosed air flows in a circuit, from the heater in the upward direction to the housing where it is cooled and back again to the wall. If the sensor is in a horizontal position, the "cloud" of heating air is symmetrical here. Both temperature sensors sense identical temperatures. If the sensor is tilted at a specific angle, the two temperature sensors register different temperature values. The inclination can be determined from the temperature difference which results from the inclination. Such sensors may be embodied here in different ways. Reference is made for this purpose to Helmut Lemme: "Elektronische Wunderwaage (Marvellous electronic scales)", Elektronik 14/2001, pages 36 to 41. The disclosure content relating to the specific configuration of the sensor structural units for sensing the inclination by means of an inclination-dependent temperature difference is included here to its full extent in the disclosure content of this publication. Said sensor can be embodied here as a sensor with an external difference amplifier and microcontroller, it being also possible to arrange the microcontroller for conditioning the variables sensed by means of the sensor directly on the device for predefining the driver's request, preferably on the pushbutton key switch, or to form one structural unit with it. Furthermore, the function of the microcontroller can also be formed by the microcomputer unit which is present in any case for the sensor-specific conditioning during the actuation of the individual operator controls of the pushbutton key switch. A further possibility is for the sensor structural unit corresponding to the disclosure of the aforesaid publication to be embodied in accordance with the design from MEMSIO.

According to a further aspect of the invention, the device for predefining a driver's request comprises at least one computer for the sensor-specific conditioning of the sensed data. Said computer is also coupled to the device for sensing the variables which at least indirectly describe the inclination of the roadway.

The computer is preferably formed by a control device. The latter is used not only for the sensor-specific conditioning of the sensed data in order to determine the inclination of the roadway but also preferably has a calculation device which is used, at least by means of a calculation unit, for partial conditioning of the variable or variables sensed by means of the device for sensing a variable which at least indirectly describes the inclination of the roadway. In particular, the possibility comprises determining the altitudes from the pressure values by means of a first calculation unit. From the calculated or derived altitudes it is then possible to determine the inclination of the roadway either in separate control devices or else the aforesaid one control device. In the second case mentioned it is necessary for the calculation device to have a further calculation unit which is used to determine the difference, in the driving direction, between two altitudes which are determined for two reference events. The reference route traveled is then determined from said altitudes by means of a further third calculation unit, and the inclination N is also derived from the relationship for the angle of inclination tangent a=Δh: Δs.

In one particularly compact embodiment, a control device which is already integrated into the device for predefining the driver's request or arranged directly on it is used to determine the inclination and determination which to the conditioning of the data of the pressure sensor or of another sensor which supply data for describing the inclination value. However, in one particularly compact development of this basic design, the control device also performs further functions, in particular it forms a partial control unit of a control device for actuating a transmission unit. In this case, values are formed from the physical variables, which characterize the actuation of the actuation elements, in accordance with the input signals for the control device, which signals are processed in the control device with further variables which can be predefined at the vehicle end in order to actuate the transmission unit. In this case, a further, independent control unit is assigned to the transmission unit, said control unit forming a second component control unit of an overall control device for actuating the actuator elements of individual switching elements or of other power-transmitting elements of the transmission unit. The variables or output variables which are processed by the control unit which is coupled to the device for predefining a driver's request for setting or changing a driving state are fed to the second component control unit, and corresponding actuating signals for actuating the actuator elements, in particular the switching elements, are formed from said variables. The coupling between the control unit which is directly assigned to the transmission unit and the control unit which is coupled to the device for predefining a driver's request for setting or changing a driving state is preferably carried out by means of a serial interface, preferably a CAN bus. This solution constitutes a minimal design in terms of necessary line connections. In particular, the line connections between the devices for sensing variables which are present at the vehicle end can be kept very small in order to be taken into account in the actuation of the transmission unit and the control unit which is coupled to the device for preselecting a driver's request for setting or changing the driving state, as they are arranged spatially very close to one another and therefore no line connections are necessary over long stretches of the vehicle. This applies analogously also to the corresponding couplings between the control unit which is assigned to the transmission unit and the actuator elements which are to be actuated. If necessary, the coupling of the individual calculation units for determining the inclination of the roadway also takes place via this serial interface, it being possible to distribute said determining operation between the two component control units of the overall control device.

The device for predefining the driver's request can be embodied in a variety of ways. Embodiments as selector lever, switching devices in the form of pushbutton key switches, toggle switches etc. are conceivable.

BRIEF DESCRIPTION OF THE DRAWINGS

FIGS. 2a to 2c are block diagrams showing exemplary refinements of the combination of the device for predefining a driver's request for changing or setting a driving state and a device for at least indirectly sensing a variable that at least indirectly characterizes the inclination of the roadway.

DETAILED DESCRIPTION

Figure 1A:
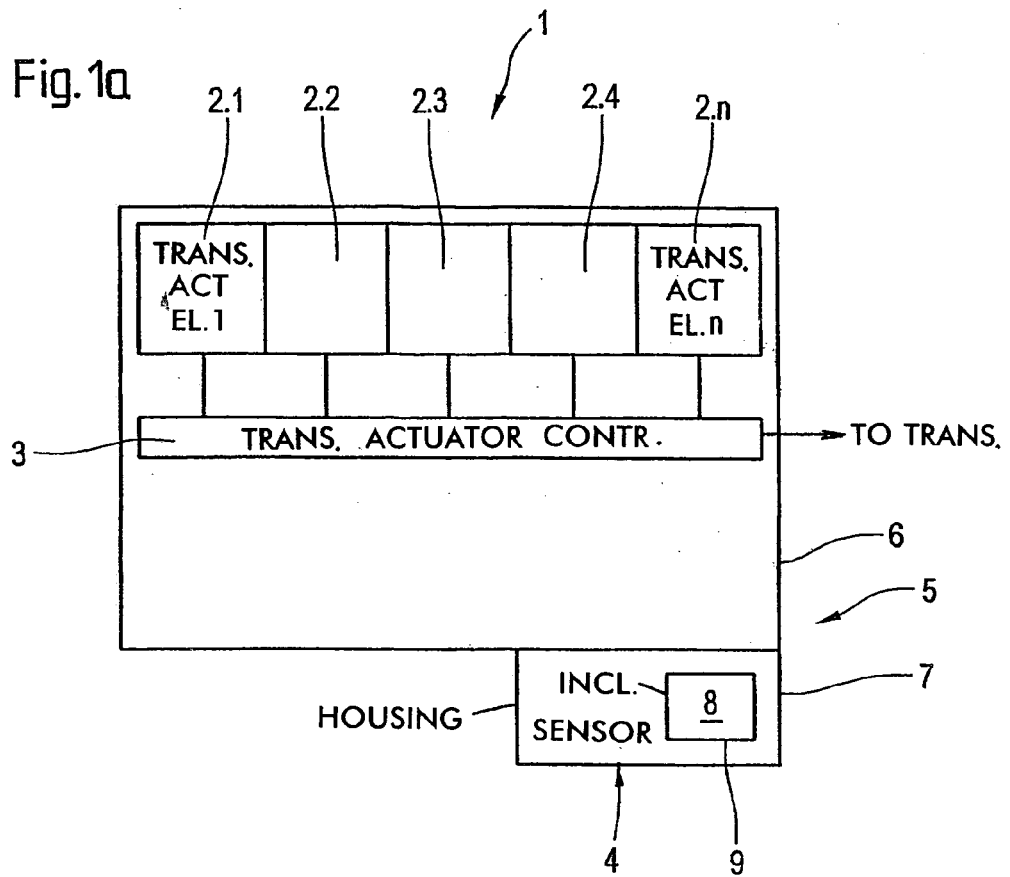
FIG. 1a is a block diagram of an exemplary embodiment of a device for preselecting a driver's request for changing or setting a specific driving state with a device.
Figure 1B:
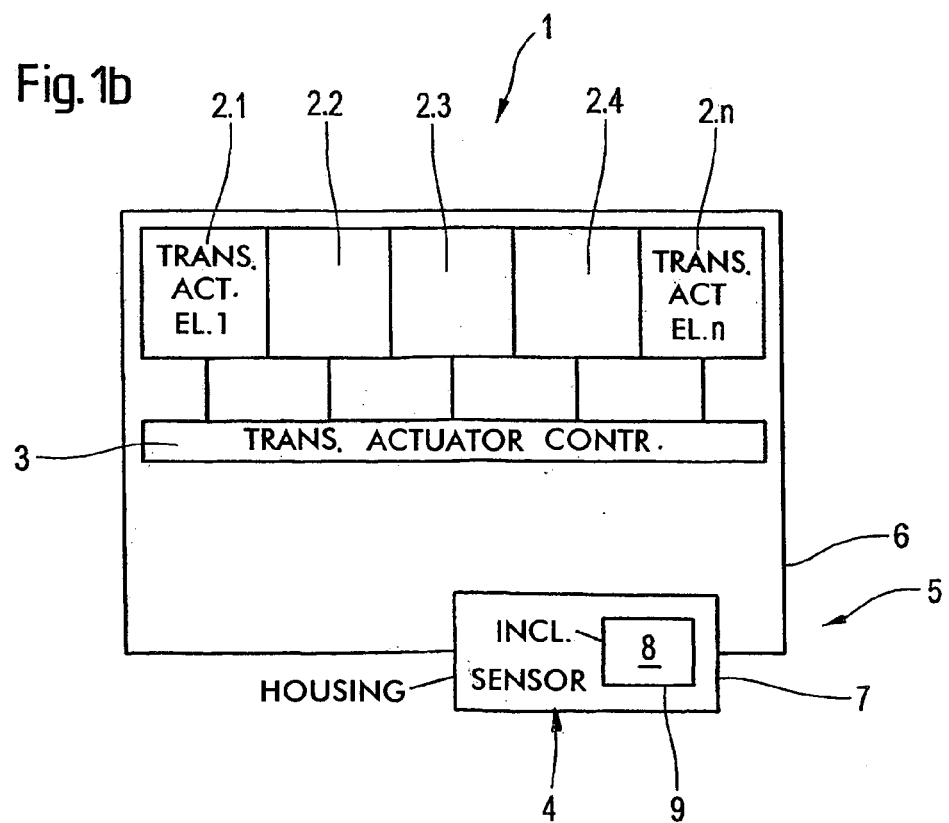
FIG. 1b is a block diagram of an exemplary device according to the present invention for predefining a driver's request for changing or setting a driving state with at least partial integration of a device for at least indirectly sensing a variable that at least indirectly characterizes the inclination of the roadway.

FIGS. 1a and 1b clarify the design of an inventive device 1 for predefining a driver's request for setting a driving state of a transmission unit in a drive system, comprising a device 4 for at least indirectly sensing a variable which characterizes the inclination N of a roadway at least indirectly, i.e. at least indirectly or directly. The device 1 for predefining the driver's request comprises actuation elements 2.1 to 2.n and means 3 for generating signals for at least indirectly actuating the transmission unit composed of the physical and/or mechanical variables which are provided by means of the actuation elements 2 in the case of actuation. The driver's request is predefined here by actuating either the actuation element 2.1 embodied as a gearshift lever, or the individual actuation elements 2.2 to 2.N when the device for predefining the driver's request is embodiment as a pushbutton key switch, as represented in FIG. 1a. The driver's request is determined here from at least one of the variables mentioned below, which describe the actuation of the actuation element 2 or of the individual actuation elements 2.1 to 2.N:

Travel s
Angle α
Time period of actuation Δt
Acceleration a
Intensity or pressure The means 3 form the corresponding electrical signals for at least indirectly actuating the transmission unit from a single variable, or a plurality of the above-mentioned variables, respectively. According to the invention, a device 4 for at least indirectly sensing a variable which at least indirectly determines the inclination of the roadway is assigned to the device 1 for predefining a driver's request for setting or changing the driving state. The assignment can be carried out here in such a way that, when arranged in the direct vicinity of one another, the device for predefining a driver's request 1 form one structural unit with the device 4 for at least indirectly sensing a variable which at least indirectly characterizes the inclination of the roadway. The structural unit can be formed, as illustrated in FIG. 1a, by connecting the device 1 for predefining the driver's request for setting or changing a driving state and the device 4 for at least indirectly sensing a variable which at least indirectly determines the inclination of the roadway to one another by flanges in the region of their housings, the housing 6 of the device 1 for predefining a driver's request, and the housing 7 of the device 4 for at least indirectly sensing a variable which at least means characterizes the inclination of the roadway.

The device 4 for at least indirectly sensing a variable which at least indirectly characterizes the inclination of the roadway comprises at least one sensor 8 which is used to sense the ambient pressure.

In contrast, FIG. 1b discloses an embodiment in which the device for at least indirectly sensing a variable 4 which at least indirectly determines the inclination of the roadway is integrated into the device for predefining a driver's request for setting or changing a driving state, at least partially in the housing 6 of the device 1.

Figure 2B:
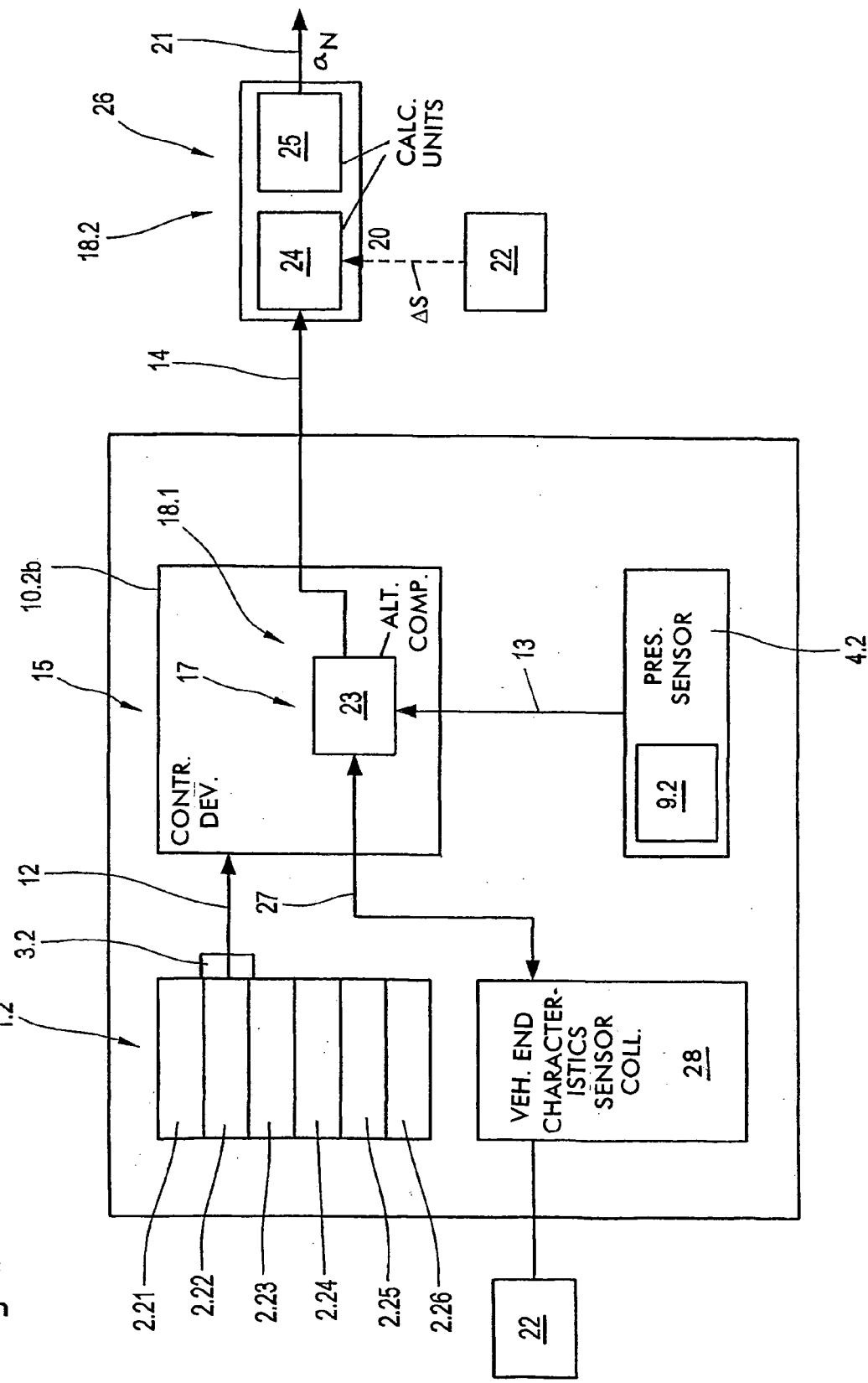

FIGS. 2a to 2c clarify, by means of block diagrams, particularly preferred refinements of the device 1.2 for predefining a driver's request for setting or changing the driving state with an integrated device 4.2 for at least indirectly sensing a variable which at least indirectly describes the inclination of the roadway. Device 1.2 also comprises an actuation element 2.2, in particular the individual actuation elements 2.21 to 2.2N for selecting the driving state or the gear speeds to be engaged. Furthermore, Device 1.2 comprises the device 4.2 for at least indirectly sensing a variable which at least indirectly determines the inclination of the roadway, in the form of what is referred to as an inclination sensor 8.2, preferably in the form of a pressure sensor 9.2, which can be integrated on the housing 6 of the device 1.2 or at least partially in the housing 6. In addition, at least one computer 10, preferably in the form of a microcomputer, is provided which is assigned both to the device for predefining a driver's request 1.2 and to the device 4, i.e. the inclination sensor 8.2. The minimum function of the computer 10 is determined here by the sensor-specific conditioning of the individual sensed data, in particular the necessary compensation measures. For this purpose, the latter is coupled, on the one hand, to the actuation elements 2.2 and to the individual actuation elements 2.21 to 2.2N via the means 3.2 for generating signals which represent the driver's request, from the physical and the mechanical variables which are predefined by the actuation of the actuation elements 2.2 and 2.21 to 2.2N, and the device 4.2 in the form of the inclination sensor, in particular the pressure sensor 9.2. For this purpose, the computer 10 has at least the two inputs 12 and 13. Furthermore, the computer 10 has at least one input 14—sufficient in the case of serial data transmission—which is coupled to other control devices or the processing systems. In the minimum solution, the computer 10 serves merely for the sensor-specific conditioning of the data which is determined and sensed by means of the device 1 and/or device 4. In a configuration which is compact in terms of parts, the latter is a component of a control device 15, the designation control device being used to describe the technical equipment and being embodied as a control unit as a rule. The control device 15 and the device 1.2 for predefining the driver's request for setting or changing the driving state are arranged either in the direct vicinity of one another in terms of parts and thus form one structural unit through their coupling to one another, or are integrated by integration in a common housing, indicated by 16 in the block diagram according to FIG. 2a. The control device 15 is used not only for processing the physical and mechanical variables which are predefined by means of the actuation elements 2.2, in particular the individual actuation elements 2.21 to 2.2N and which are already processed by means of the means 3.2 for generating signals, but also for processing the necessary variables which occur at the vehicle end for the actuation of the individual switching elements and power transmitting elements of the transmission unit in the case of integration in drive systems of vehicles. These variables include, for example, predefinition signals, indicated here in particular only by way of example, for actuating certain transmission-specific elements, in particular braking devices. Here, the control device 15 already processes all the variables whose sensing devices are arranged in the spatial vicinity of the device 1.2 for predefining the driver's request and do not exceed a specific distance as such a solution should especially avoid the disadvantage of unnecessary connecting lines over considerable distances by virtue of the fact that a multiplicity of variables which are made available in sensing devices arranged in the vicinity of the control device 15 can be processed and can be fed as a processing event to the corresponding controller of a drive component, in particular the transmission unit. For this purpose, the control device comprises at least one further input 27 which is coupled to devices (not represented here in particular) for sensing vehicle-end characteristic variables, the coupling being carried out in the case illustrated by means of a unit 28 which collects the signals of the individual device. However, it is also conceivable to couple the aforesaid devices directly to the control device 15. In the embodiment according to FIG. 2a, only the variables sensed by means of the device 4.2 are conditioned.

In one development according to the block diagram in FIG. 2b, the computer 10.2b comprises specific means 17 for processing, in particular conditioning and evaluating the variables sensed by means of the inclination sensor 8.2, in particular the pressure sensor 9.2, in order to determine later the inclination N of the roadway. The rest of the basic design of the preselection device 1.2 corresponds to that described in FIG. 2a, for which reason identical reference symbols are used for identical elements. A calculation device 18 is necessary for sensing the inclination. This is embodied in a decentralized fashion, i.e. divided into a plurality of units which are spatially remote from one another, here the calculation component devices 18.1 and 18.2, and has at least one input with serial data transmission, or as in the case illustrated, two inputs—a first input 14 and a second input 20—and an output 21 for outputting the variable of the inclination N of the roadway. The inputs—first input 14 and second input 20—are coupled here to devices for sensing the variables which are necessary to determine the inclination N. The first input 19 is coupled here to the device 4.2, in the form of a pressure sensor, for at least indirectly sensing a variable which at least indirectly determines the inclination of the roadway, and corresponds in the simplest case to the input 13 to the computer 10.2b. The input 20 is connected to a device 22 for sensing at least one variable which at least indirectly characterizes a route traveled. The device 22 for sensing a variable which at least indirectly characterizes a route between two reference events is used here either for directly determining the route or else for determining the route from other variables.

The calculation device 18 comprises a first calculation unit 23 in which the altitude is calculated using the barometric altitude formula from the pressure values determined by means of the pressure sensor 9.2, and which is arranged in a first calculation component device 18.1. Furthermore, as a function of the input variables, in particular the variables which are present at the second input 20, for the route Δs traveled during the reference time period or the reference distance, said variables are input directly for further processing or else determined from the variables which determine this variable, in the case illustrated in the calculation unit 23 or when fed to a second calculation component device 18.2 outside the device 1.2 for preselecting a driver's request in a further calculation unit. The corresponding difference values Δs and Δh are determined from the values which are determined for the pressure p, for the altitude h and the route, which are determined with respect to the first reference event 1 and with respect to the second reference event 2. This can take place in a further calculation unit 24 or else in the calculation unit 23. In a further calculation unit 25, the angle $\alpha_N$ which describes the inclination N of the roadway is determined from the relevant variables from the approximation formula $$\alpha_N = \frac{\Delta_h}{\Delta_s}; \text{ i.e. } \arctan\frac{\Delta_h}{\Delta_s}$$

in a further calculation unit 25.

The inclination N is then obtained approximately from:

$$N = \arctan\frac{\Delta_h}{\Delta_s} \cdot 100(\%)$$

Depending on the specific assignment of the individual functions for the determination of the inclination, the individual calculation units may be vertically connected to one another as independent calculation units and integrated structurally and functionally either in a single structural unit or else be components of different computing structural units, in which case the calculation device can be formed in a collective fashion by a multiplicity of computing units which are coupled to one another.

According to the embodiment in FIG. 2b, the computer 10.2, also comprises at least one additional calculation unit 23. The altitude which is determined by means of the calculation unit 23 can then be fed to corresponding calculation units for further processing, said calculation units being arranged outside the device 1.2 for predefining a driver's request and being coupled thereto merely by means of line connections, here the line connection 14.

FIG. 2c represents an embodiment of the integration of the individual calculation units 23 to 25 in the device 1.2 for predefining a driver's request for setting or changing the driving state. The individual calculation units 23 to 25 are integrated, with respect to their functions, in the computer 10.2c, in particular the microcomputer 11.2c. In this case, the signal for the variable of the inclination N of the roadway is already present in %, or a corresponding adequate value, at the output 14.

In FIGS. 2b and 2c, the entirety of the calculation units 23 to 25, the calculation device 18 or the calculation component device and the device 4.2 for sensing a variable which at least indirectly characterizes the inclination of the roadway, form an arrangement 26 for determining the inclination of the roadway.

The sensing of the inclination N of the roadway in a vehicle is characterized here in terms of a method in that the overall pressure which respectively prevails at the vehicle is determined for at least two different reference events which characterize the locomotion state of the vehicle. In each case the altitude of the vehicle above zero is determined for a first reference event, and the second altitude $h_2$ for a second reference event, from the respective pressure values—first pressure $p_1$ for the first reference event and second pressure value $p_2$ for the second reference event—from the barometric altitude formula for gravitational pressure in air. The two reference events also characterize, either directly or indirectly, a reference route Δs which is characterized by the local distance between the position of the vehicle and the two reference events. The tangent of the angle $\alpha_N$, characterizing the inclination N, of the horizontal with respect to the roadway, and thus the angle $\alpha_N$ for the inclination of the roadway with respect to the horizontal are determined from the quotient of the difference between the altitudes—second altitude and first altitude—and the reference route Δs. The inclination of the roadway in a vehicle is always sensed here between at least two reference events, it being however also possible to carry out a plurality of individual sensing operations, and thus a multiplicity of successively performed assessments of successive reference events, for the sake of more precise sensing.

The altitudes are either determined on the basis of the barometric altitude formula for gravitational pressure of air or according to Laplace.

The determination of the respective altitudes $h_1$ and $h_2$ from the sensed pressure values $p_1$ and $p_2$ ($p_1$ and $p_2$ at the reference events corresponding to the respective overall pressure prevailing there) is carried out on the basis of the barometric altitude formula which is present in various modifications.

The simplest relationship between the absolute altitude and pressure results from the formula which can be found, for example, in Kuchling, Taschenbuch der Physik (Physics handbook), Verlag Harri Deutsch.

$$p_x = p_0 \cdot e^{-\frac{p_0 G h_x}{p_0}}$$

Using the substance values for air at ground level and t=0C yields $$p_x = p_0 \cdot e^{-\frac{h_x}{7.99\,\text{km}}}$$

By converting according to altitude the following is obtained:

$$h_x = 18.4 \text{ km} \cdot 1 lg\left(\frac{p_0}{p_x}\right)$$

where

| | |
|---|---|
| $h_x$ | Altitude in x, $h_1$ being the altitude with respect to the reference event 1 and $h_2$ being the altitude with respect to reference event 2 |
| $p_x$ | Pressure at altitude x |
| $p_o$ | Pressure at mean sea level |
| G | Acceleration due to gravity 9.81 m/s² |
| $T_m$ | Average thermodynamic temperature in ° C. |
| α | Thermal coefficient of expansion 1/273° |

This simplest altitude formula does not take into account the change in the temperature as altitude increases, which is however not absolutely necessary for the present invention as only relative changes in the altitude are determined and the temperature influence on this is very low.

Nevertheless, more precise formulae can be used. One possibility is to use the international altitude formula which takes into account the change in temperature with altitude:

$$p_x = 1013 \text{ hPa} \left(1 - \frac{6.5 \, h_x}{288 \text{ km}}\right)^{5.255}$$

After conversion this yields:

$$h_x = \frac{288 \text{ km}}{6.5}\left(1 - \left(\frac{p_x}{1013 \text{ hPa}}\right)^{\frac{1}{5.255}}\right)$$

Here, a fixed relationship between the altitude and air temperature is taken into account, said relationship being valid with a sufficient degree of precision up to 11 000 m above mean sea level.

Another variant in the barometric altitude formula is obtained if the average thermodynamic temperature $T_m$ which is related to the temperature at mean sea level is taken into account, said temperature $T_m$ being calculated from the temperature $t_x$ prevailing at the current altitude $h_x$, according to the following formulation:

$$T_m = t_x - h_x/100 \text{ m} * 0.65° \text{ C}.$$

$$h_x = 18.4 \text{ km} \cdot (1 + \alpha T_m) lg\left(\frac{p_0}{p_x}\right) = 18.4 \text{ km} \cdot (1 + \alpha T) \cdot lgp_0 - lgp_k$$

The necessary altitudes $h_1$ and $h_2$ are obtained by applying the equation for $h_x$ by setting $h_x = h_1$ and $p_x = p_1$, or $h_x = h_2$ and $p_x = p_2$.

The altitudes $h_1$ and $h_2$ are determined when the associated reference events 1 and 2 occur.

In order to avoid errors, additional measures may be taken, and possibly a plausibility check may be carried out. In this case, additional variables have to be taken into account by the calculation unit.

The invention claimed is:

1. A device for operating a vehicle transmission, comprising:
   a computation unit,
   a transmission control unit operated by the computation unit;
   a first device configured to sense a variable from which inclination of a roadway can be determined and to communicate a first signal representing the variable to the computation unit; and
   a second device operable by a driver to select a driving state for the transmission, and to communicate a second signal representing the selected driving state to the computation unit, the computation unit being operative to process the first and second signals and thereby to control operation of the transmission;
   wherein the first and second devices and at least a part of the computation unit are arranged in a common housing, or in two housings mounted one on the other, to form a compact and easily exchangeable structural unit, the structural unit being arranged within reach of the driver, whereby the first device is substantially protected from factors that may influence the operation thereof.

2. The device according to claim 1, wherein the first and second devices include respective housings having respective flanges, the first and second devices being connected to one another by the respective flanges to form the structural unit.

3. The device according to claim 1, wherein the first device is at least partially integrated into the second device to form the structural unit.

4. The device according to claim 1, wherein the first device includes a pressure sensor to sense the air pressure.

5. The device according to claim 1, wherein the first device includes at least one temperature sensor to sense an air temperature, the air pressure being sensed in accordance with the sensed air temperature.

6. The device according to claim 5, wherein the first device includes a hermetically sealed housing and a sensor unit arranged inside the housing, the sensor unit including a bridge, at least two temperature sensors connected to one another via the bridge, and a heating element arranged between the two temperature sensors, wherein the sensor unit is configured to sense the variable that at least indirectly characterizes the inclination of the roadway in accordance with a thermal convection of an air flow within the housing.

7. The device according to claim 6, wherein the temperature sensors include respective silicon webs and respective resistance measuring devices assigned to the respective silicon webs, wherein the temperature sensors are configured to sense the air temperature in accordance with a respective current flow through the respective resistance measuring devices.

8. The device according to claim 4, wherein the first device receives a third variable characterizing a route traveled by the vehicle, the first device being configured to determine a length of the roadway in accordance with the third variable and configured to determine an altitude of the vehicle in accordance with the sensed air pressure, the first device determining the altitude at a time corresponding to two reference events to produce first and second altitude measurements, the first device configured to determine the inclination of the roadway in accordance with a difference between the first and second altitude measurements and the length of the roadway.

9. The device according to claim 1, wherein the second device includes at least one actuation element of the transmission, the second device configured to produce a physical variable describing an actuation state of the actuation element to change the driving state of the vehicle.

10. The device according to claim 9, wherein the at least one actuation element includes at least one switching element, the second device configured to produce the physical variable in accordance with an actuation state of the switching element.

11. The device according to claim 1, wherein the structural unit includes the computation unit.

12. The device according to claim 1, wherein the second device includes at least one pushbutton key switch configured to be operated by the driver of the vehicle.

13. The device according to claim 12, wherein the pushbutton key switch includes at least one of pressure switch, a toggle switch, and a manually operable lever.

* * * * *